Feb. 13, 1940.   C. SELLINGER ET AL   2,190,489
COMBINATION JACK AND AUTOMOBILE THEFT PREVENTION DEVICE
Filed July 6, 1939   2 Sheets-Sheet 1
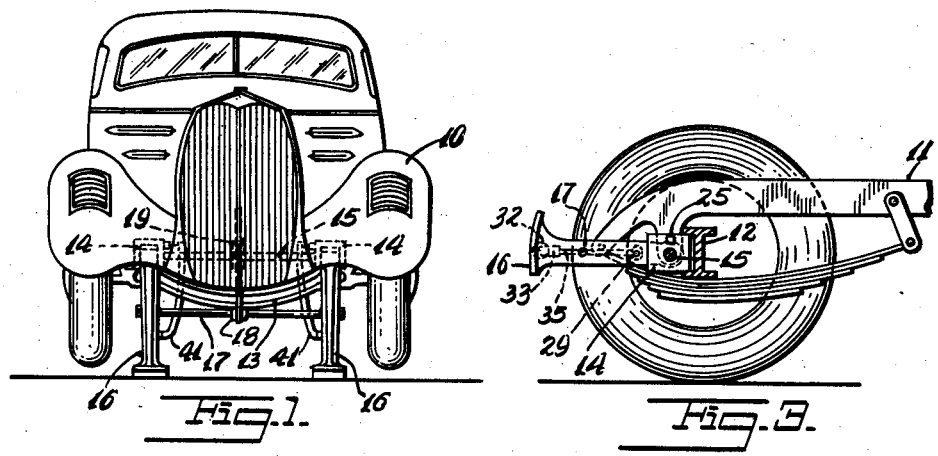
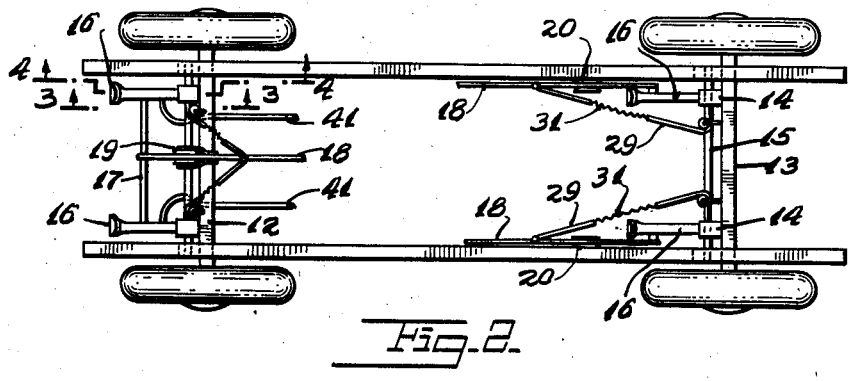
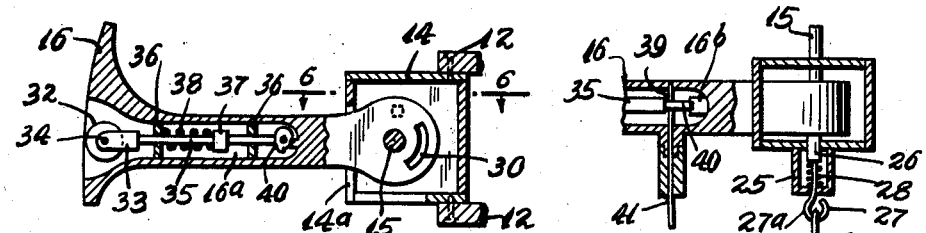
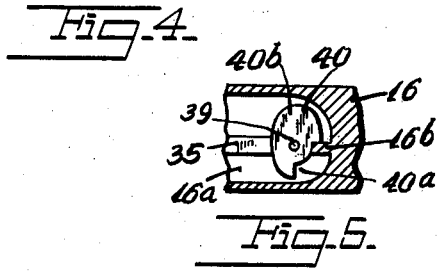
INVENTORS
Carl Sellinger
Ernest Forster
BY
ATTORNEY Feb. 13, 1940.　　　C. SELLINGER ET AL　　　2,190,489
COMBINATION JACK AND AUTOMOBILE THEFT PREVENTION DEVICE
Filed July 6, 1939　　　2 Sheets-Sheet 2

INVENTORS
Carl Sellinger
Ernest Forster
BY
ATTORNEY

Patented Feb. 13, 1940

2,190,489

UNITED STATES PATENT OFFICE 2,190,489

COMBINATION JACK AND AUTOMOBILE THEFT PREVENTION DEVICE

Carl Sellinger and Ernest Forster, Newark, N. J.

Application July 6, 1939, Serial No. 282,997

6 Claims. (Cl. 254—86)

This invention relates to new and useful improvements in combination jack and automobile theft prevention device.

More specifically the invention proposes the construction of a combination jack and automobile theft device characterized by a housing adapted to be attached upon the automobile in the vicinity of the axle, one for each of the wheels of the automobile, and each of which has a jack arm pivotally mounted in the housing and extending from a slot formed in the side, in a manner to be pivoted from an inoperative to an operative position and vice versa.

Still further it is proposed to provide a cable having one of its ends connected to one jack arm and the other of its ends connected to a manual means for regulating the cable to operate the jack arm.

Still further it is proposed to provide a casing with a latch means for engaging a cooperative member on the jack arm when in the lowered position, for preventing the same from being raised except when the said manual means is operated.

Another object of this invention is the provision of a wheel retractively mounted in the bottom of the jack arm in a manner to be extendable therefrom when the jack arm is inoperative.

Another object of this invention is to so arrange the wheel that it will be capable of engaging the ground when the automobile has a flat tire for permitting the same to be driven to a service station or other convenient point for changing the tire.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front view of an automobile having a combination jack and automobile theft prevention device constructed according to this invention.

Fig. 2 is a plan view on a chassis of the automobile constructed in accordance with this invention.

Fig. 3 is a sectional view on the line 3—3 of Fig. 2.

Fig. 4 is a sectional view on the line 4—4 of Fig. 2.

Fig. 5 is an enlarged detailed view of a portion of Fig. 4.

Fig. 6 is a sectional view on the line 6—6 of Fig. 4.

Figure 9:
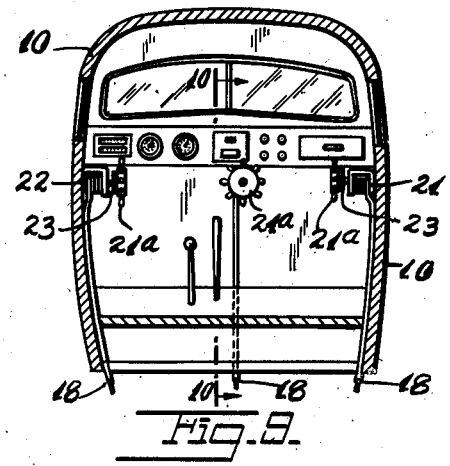
Fig. 9 is a sectional view through the body of the automobile showing the mechanism located on the interior thereof.

The combination jack and automobile theft device, according to this invention, is adapted to be used in combination with an automobile 10 having a chassis 11 provided with a front axle 12 and a rear axle 13.

Specifically the combination jack and automobile theft prevention device includes a housing 14 for each of the wheels of the automobile mounted in the vicinity of the axles 12 and 13. Each pair of housings has a shaft 15 extended therethrough. The shafts 15 have their ends supported upon the chassis 11 of the automobile 10 to the front of the axles 12 and 13.

Each of the housings 14 has a jack arm 16 having its top end pivotally mounted in the housing and extending from a slot 14ª formed in the side of the housing 14.

Each of the jack arms 16 has its upper end pivotally supported upon the shafts 15 which pass through the housing 14.

The front pair of jack arms 16 are connected together by means of a tie rod 17 for causing the same to move simultaneously upwards or downwards. A cable 18 has one of its ends attached to the rod 17. An intermediate portion of the cable 18 extends over a pulley 19 mounted upon a portion of the front axle 12. A similar cable 18 is connected to each of rear jack arms 16. Each of the rear cables 18 passes over the pulley 20 mounted upon the chassis 11 of the automobile 10.

A manual means is provided for regulating each of the cables 18 for operating the jack arms 16. This manual means comprises a shaft 21 pivotally supported within the interior of the automobile body 10. This shaft 21 carries a drum 22 upon which the free end of the cable 18 is mounted. There is a drum 22 within the automobile body for each of the cables 18. A ratchet wheel 23 is mounted upon each of the shafts 21 to the front of the drums 22. Each of the ratchet wheels 23 is adapted to be engaged by a pivotally mounted pawl 24 mounted upon a stationary portion of the automobile body 10. This pawl 24 engages the teeth of the ratchet wheel 23 in a manner to permit the drum 22 to be easily turned for winding the cable 18 thereon but preventing the cable from being unwound therefrom unless the pawl 24 is disengaged from the teeth of the ratchet wheel 23. Thus, the ratchet wheel and pawl act to hold the jack arms 10 in their raised position, see Fig. 3, and prevent the same from being lowered unless the pawl 24 is pivoted out and disengaged with relation to the ratchet wheel 23. The shafts 21 carry handles 21a by which means they may be conveniently turned.

Figure 7:
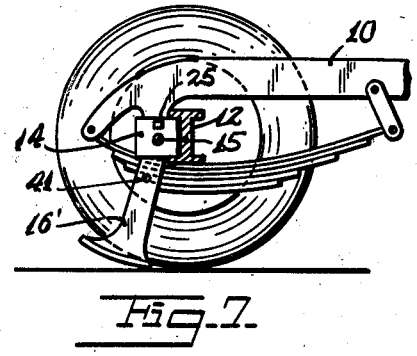
Fig. 7 is a view similar to Fig. 3 but illustrating one adjusted position of the parts.
Figure 10:
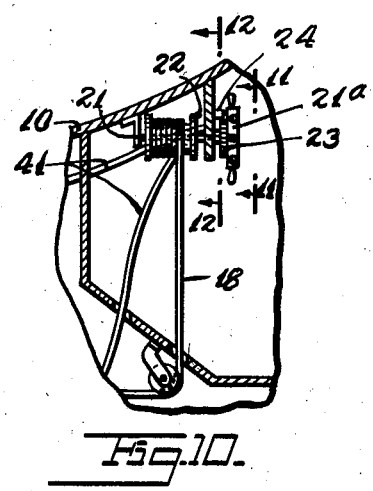
Fig. 10 is a sectional view on the line 10—10 of Fig. 9.

A latch is provided for preventing each of the jack arms from being lifted off the ground when it reaches the lowered position, see Fig. 7. This latch comprises a casing 25 mounted upon the inside face of each of the housings 14. Each of the casings 25 has a slidably mounted bolt 26, the inner end of each projects into the housing 14 and bears against the end of the jack arm 16. Each of the bolts 26 has an outwardly extending pin portion 27 provided with a loop portion 27a at its extended end. A spring 28 is coaxially mounted upon the pin portion 27 and operates between the end wall of the casing 25 of the adjacent end of the bolt 26 for urging the bolt into the housing 14. A cable 29 has one of its ends attached to the loop member 27a and the other of its ends attached to its respective cable 18. Thus when the cables 18 are moved to raise the jack arms 16 the bolts 26 will be withdrawn from the housing 17. The inner ends of the bolts 26 when the jack arms 16 reach their lowered position as shown in Fig. 7 are adapted to engage into a cutout 30 formed in the adjacent face of the jack arm 16 for preventing the same from being lifted after it has once been lowered. This prevents a prospective thief of a parked automobile from raising the jack arms before moving the automobile.

When the jack arms 16 are being raised the cable 18 must be moved through a much greater distance than is needed for disengaging the belts 26 from the housing 14 to disengage them from the cutouts 30. Therefore each of the cables 29 is provided at their intermediate portion with a spring 31 which is adapted to stretch as the cable 18 moves further after the bolt 26 has reached its completely ejected position. The stretching of this spring permits the jack arms to be completely raised after the bolts 26 have been completely ejected from the housing 14.

Each of the jack arms 16 is provided with a means for permitting the automobile to be driven with a flat tire when the jack arm is in the operative position. This means comprises a retractable wheel 32 mounted within the inwardly extending cutout 16a formed in the bottom of the jack arm 16. This wheel 32 is rotatively supported between the arms of the yoke 33 positioned within the cutout 16a. A pin 34 extends between the arms of the yoke 33 and has a wheel 32 rotatively supported thereon. The inner end of the yoke 33 is connected to one end of a rod 35 slidably supported in a pair of spaced bearings 36 mounted within cutouts 16a and spaced from the bottom of the jack arm 16. A collar 37 is mounted upon the rod 35 between the bearings 36. An expansion spring 38 is coaxially mounted upon the rod and operates between the lowermost bearing 36 and the adjacent face of the collar 37 for urging the rod 35 into a position in which the wheel 32 will be in a retracted position as shown in Fig. 4.

Figure 8:
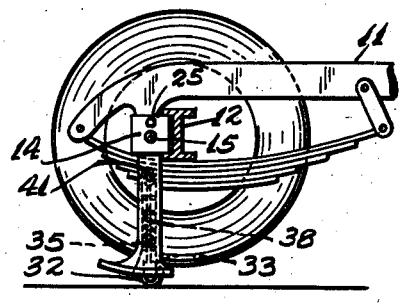
Fig. 8 is another view similar to Fig. 3 illustrating another adjusted position of the parts.
Figure 11:
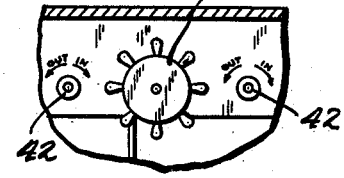
Fig. 11 is a view looking in the direction of the line 11—11 of Fig. 10.
Figure 12:
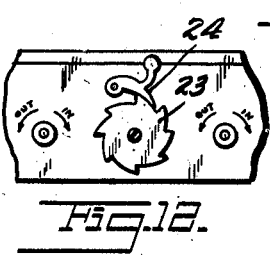
Fig. 12 is a sectional view on the line 12—12 of Fig.10.

Adjacent the inner end of the rod 35 a shaft 39 is rotatively supported between the side walls of the jack arms 16. This shaft 39 carries a cam 40. This cam 40 has a cutout portion 40a engaged by a tail 16b formed on the interior of the jack arm 16 for limiting the distance through which the cam 40 may be turned. This cam 40 also has one thickened portion 40b which is adapted to engage the inner end of the rod 35 when turned for urging the rod 35 downwards against action of the spring 38 to extend the wheel 32 as shown in Fig. 8. One end of the shaft 40 extends from the inner side of the jack arm 16 and is connected to a flexible shaft 41. This flexible shaft 41 extends to the interior of the automobile and is provided with a knob 42 which may be turned to complementary turn the shaft 41 to rotate the cam 40 as described.

In operating this device it is necessary that the knobs 42 be rotated for extending the wheels 32 while the jack arms 16 are in an inoperative position as shown in Figs. 3 and 7. If so operated the wheels 32 will be extended and upon any forward movement of the automobile the jack arm 16 will reach a vertical position as shown in Fig. 8. With the wheel 32 engaging the ground the automobile may be driven even though it might have a flat tire. It is impossible to rotate the knob 42 to extend the wheels 32 when the jack arms reach their operative position as shown in Fig. 8.

The operation of this device is as follows:

If using the device as a theft prevention device the pawl 24 is disengaged from the rachet wheels 23 and the handles 21a rotated to rotate the drums 22 to unwind the cables 18 therefrom. This movement of the cable 18 causes the jack arms 16 to be lowered until they reach the position shown in Fig. 7. When they reach this position the bolts 26 will move into the housing 14 and engage into the adjacent end of the cutouts 30 formed in the jack arms 16 for preventing the jack arms from being lifted unless the cables 18 are rewound upon the drums 22. With the jack arms engaging the ground as shown in Fig. 7 if an unauthorized person attempts to move the vehicle any forward movement will cause the jack arms to move to the position shown in Fig. 8, (however the wheels 32 will not be extended), for limiting the automobile from being moved.

For using the device as a jack to permit the automobile to be driven with a flat tire the jack arm adjacent the flat tire is lowered to the position shown in Fig. 7 in a manner similar to that previously described. The proper knob 42 of the flexible cables 41 is then rotated for rotating the cam 40 to cause the wheel 32 to be extended from the jack arm to engage the ground when the automobile moves forward as shown in Fig. 8 to permit the automobile to be driven to a service station or other convenient point for changing the tire. In both instances the jack arms 16 will be prevented from moving beyond the vertical position by means of the jack arms 16 engaging the rear end of the cutout 14a and also the bolts 26 will engage the rear end of the cutout 30 for holding the same in this vertical position.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A combination jack and automobile theft prevention device, comprising a housing adapted to be attached upon an automobile in the vicinity of an axle of the automobile, a jack arm having its top end pivotally mounted in said housing and extending from a slot in the side of the housing, a cable connected with said jack arm for holding said arm lifted, manual means for releasing said cable to lower said jack arm to rest on the ground, a latch for preventing said jack arm from being lifted off the ground when lowered, said jack arm being adapted to be rendered operative and lift the automobile if same is moved forwards while the arm rests on the ground, a wheel retractably mounted on the bottom of said jack arm, and means for extending said wheel when the jack arm is inoperative.

2. A combination jack and automobile theft prevention device, comprising a housing adapted to be attached upon an automobile in the vicinity of an axle of the automobile, a jack arm having its top end pivotally mounted in said housing and extending from a slot in the side of the housing, a cable connected with said jack arm for holding said arm lifted, manual means for releasing said cable to lower said jack arm to rest on the ground, a latch for preventing said jack arm from being lifted off the ground when lowered, said jack arm being adapted to be rendered operative and lift the automobile if same is moved forwards while the arm rests on the ground, a wheel retractably mounted on the bottom of said jack arm, and means for extending said wheel when the jack arm is inoperative, said first-mentioned manual means comprising a shaft, a means for rotatively supporting said shaft, a drum mounted on said shaft and having said cable connected therewith, a ratchet wheel mounted upon the said shaft, a pawl engaging the teeth of said ratchet wheel in a manner to permit said shaft to be freely rotated to raise said jack arms but requiring said pawl to be disengaged from said ratchet wheel to lower said jack arm.

3. A combination jack and automobile theft prevention device, comprising a housing adapted to be attached upon an automobile in the vicinity of an axle of the automobile, a jack arm having its top end pivotally mounted in said housing and extending from a slot in the side of the housing, a cable connected with said jack arm for holding said arm lifted, manual means for releasing said cable to lower said jack arm to rest on the ground, a latch for preventing said jack arm from being lifted off the ground when lowered, said jack arm being adapted to be rendered operative and lift the automobile if same is moved forwards while the arm rests on the ground, a wheel retractably mounted on the bottom of said jack arm, and means for extending said wheel when the jack arm is inoperative, said first-mentioned manual means comprising a shaft, means for rotatively supporting said shaft, a drum mounted on said shaft and having said cable connected therewith, a ratchet wheel mounted upon the said shaft, a pawl engaging the teeth of said ratchet wheel in a manner to permit said shaft to be freely rotated to raise said jack arms but requiring said pawl to be disengaged from said ratchet wheel to lower said jack arm, and a handle mounted upon the extended portion of the shaft for permitting the same to be conveniently turned to raise or lower said jack.

4. A combination jack and automobile theft prevention device, comprising a housing adapted to be attached upon an automobile in the vicinity of an axle of the automobile, a jack arm having its top end pivotally mounted in said housing and extending from a slot in the side of the housing, a cable connected with said jack arm for holding said arm lifted, manual means for releasing said cable to lower said jack arm to rest on the ground, a latch for preventing said jack arm from being lifted off the ground when lowered, said jack arm being adapted to be rendered operative and lift the automobile if same is moved forwards while the arm rests on the ground, a wheel retractably mounted on the bottom of said jack arm, and means for extending said wheel when the jack arm is inoperative, said latch comprising a casing mounted on the side of said housing, a bolt slidably mounted in said casing and extended into said housing, a cutout formed in the said jack arm to be engaged by said bolt, a spring for urging said bolt into engagement with said cutout and a means for connecting said bolt to said cable for causing said bolt to be retracted when said jack arm is raised.

5. A combination jack and automobile theft prevention device, comprising a housing adapted to be attached upon an automobile in the vicinity of an axle of the automobile, a jack arm having its top end pivotally mounted in said housing and extending from a slot in the side of the housing, a cable connected with said jack arm for holding said arm lifted, manual means for releasing said cable to lower said jack arm to rest on the ground, a latch for preventing said jack arm from being lifted off the ground when lowered, said jack arm being adapted to be rendered operative and lift the automobile if same is moved forwards while the arm rests on the ground, a wheel retractably mounted on the bottom of said jack arm, and means for extending said wheel when the jack arm is inoperative, said retractable mounting on said wheel comprising a yoke for supporting said wheel mounted in a cutout formed in the bottom of said arm, a rod extending from said yoke, a pair of spaced bearings for slidably supporting said rod, a collar mounted on said rod between said bearings, resilient means operative between said collar on one of said bearings for urging said rod into a position in which said wheel will be retracted.

6. A combination jack and automobile theft prevention device, comprising a housing adapted to be attached upon an automobile in the vicinity of an axle of the automobile, a jack arm having its top end pivotally mounted in said housing and extending from a slot in the side of the housing, a cable connected with said jack arm for holding said arm lifted, manual means for releasing said cable to lower said jack arm to rest on the ground, a latch for preventing said jack arm from being lifted off the ground when lowered, said jack arm being adapted to be rendered operative and lift the automobile if same is moved forwards while the arm rests on the ground, a wheel retractably mounted on the bottom of said jack arm, and means for extending said wheel when the jack arm is inoperative, said retractable mounting on said wheel comprising a yoke for supporting said wheel mounted in a cutout formed in the bottom of said arm, a rod extending from said yoke, a pair of spaced bearings for slidably supporting said rod, a collar mounted on said rod between said bearings, resilient means operative between said collar on one of said bearings for urging said rod into a position in which said wheel will be retracted, said means for extending said wheel comprising a cam rotatively supporting and engageable against said rod for causing said rod to be urged to extend said wheel against the operation of said spring, and a flexible shaft having one of its ends attached to said cam and the other of its ends extended to the interior of said automobile in a manner to be rotated for rotating said cam to extend said wheel.

CARL SELLINGER.
ERNEST FORSTER.